(12) United States Patent
Rao et al.

(10) Patent No.: US 6,768,768 B2
(45) Date of Patent: Jul. 27, 2004

(54) METHOD AND APPARATUS FOR STEP TWO W-CDMA SEARCHING

(75) Inventors: Subramanya P. Rao, San Jose, CA (US); Sivarama Venkatesan, Secaucus, NJ (US); Gwang-Hyun Gho, Palo Alto, CA (US); Avneesh Agrawal, San Jose, CA (US); Daisuke Terasawa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 143 days.

(21) Appl. No.: 09/957,377

(22) Filed: Sep. 19, 2001

(65) Prior Publication Data

US 2003/0063656 A1 Apr. 3, 2003

(51) Int. Cl.[7] .............................................. H04L 27/30
(52) U.S. Cl. ..................... 375/142; 475/150; 475/343; 370/342; 370/441; 370/479
(58) Field of Search ................................ 375/140, 141, 375/142, 145, 147, 149, 150, 343, 362, 364–367; 370/320, 342, 441, 479, 509, 510, 512, 514, 515

(56) References Cited

U.S. PATENT DOCUMENTS

| 5,930,366 A | | 7/1999 | Jamal et al. | |
| 5,991,330 A | * | 11/1999 | Dahlman et al. | ............ 375/149 |
| 6,108,324 A | * | 8/2000 | Brown et al. | ................ 370/335 |
| 6,185,244 B1 | * | 2/2001 | Nystrom et al. | ............ 375/145 |

FOREIGN PATENT DOCUMENTS

| EP | 1056217 | 5/2000 |
| WO | 0101596 | 1/2001 |

OTHER PUBLICATIONS

Wang, et al., *Cell Search in W–CDMA*, IEEE Journal on Selected Areas in Communications, vol. 18, No. 8 (2000).
Nystrom, et al., *Comparison of Cell Search Methods for Asynchronous Wideband CDMA Cellular System*, IEEE, 0–7803–5106 (1998).
Higuchi, et al., *Experiments on fast cell search algorithm for intercell asynchronous W–CDMA mobile radio*, Electronics Letters, vol. 35:13 (6/99).

* cited by examiner

*Primary Examiner*—Stephen Chin
*Assistant Examiner*—Dac V. Ha
(74) *Attorney, Agent, or Firm*—Philip R. Wadsworth; Charles D. Brown; Timothy F Loomis (57) ABSTRACT

Techniques for searching in asynchronous systems are disclosed. In one aspect, a plurality of codes, such as SSCs, are correlated with a received signal at a plurality of offsets to produce a code/slot energy corresponding to each code/slot boundary pair. Unique subsets of the code/slot energies are summed to produce code sequence energies, the maximum of which indicates a located code sequence and slot boundary. In another aspect, the correlation is performed by sub-correlating the received signal with a common sequence, and performing a Fast Hadamard Transform (FHT) on the results. In yet another aspect, one sub-correlator can be used to search a plurality of peaks simultaneously. Various other aspects of the invention are also presented. These aspects collectively have the benefit of circuit area and search-time efficiency which translate into reduced costs, increased standby time, increased acquisition speed, higher quality signal transmission, increased data throughput, decreased power, and improved overall system capacity.

11 Claims, 4 Drawing Sheets

METHOD AND APPARATUS FOR STEP TWO W-CDMA SEARCHING

FIELD

The present invention relates generally to communications, and more specifically to a novel and improved method and apparatus for step two W-CDMA searching.

BACKGROUND

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. CDMA receivers commonly employ RAKE receivers. A rake receiver is typically made up of one or more searchers for locating direct and multipath pilots from one or more base stations, and two or more multipath demodulators (fingers) for receiving and combining information signals from those base stations.

Inherent in the design of direct sequence CDMA systems is the requirement that a receiver must align its PN sequences to those of a base station. Some systems, such as those defined by the W-CDMA standard, differentiate base stations using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA base stations operate asynchronously in relation to each other, so knowledge of the frame timing of one base station does not translate into knowledge of the frame timing of any other base station.

It is possible to search for W-CDMA base stations offset by offset (38,400 of them) for each of the 512 primary codes. However, this is not practical due to the excessive amount of time such a search would require. Instead, the W-CDMA standard calls for base stations to transmit two additional synchronization channels, the primary and secondary synchronization channels, to assist the subscriber unit in searching efficiently. As a result, W-CDMA search can be performed in three steps, which will be detailed more fully below.

For initial acquisition, the three-step W-CDMA search provides a great performance increase, in terms of reduced search time, over the impractical alternative of searching the entire PN space for each scrambling code. Search time is an important metric in determining the quality of a CDMA system. Decreased search time implies that searches can be done more frequently. As such, a subscriber unit can locate and access the best available cell more often, resulting in better signal transmission and reception, often at reduced transmission power levels by both the base station and the subscriber unit. This, in turn, increases the capacity of the CDMA system (either in terms of support for an increased number of users, or higher transmission rates, or both). Furthermore, decreased search time is also advantageous when a subscriber unit is in idle mode, a low-power state where a subscriber unit is not actively transmitting or receiving voice or data, but is periodically monitoring the system. Reduced search time allows the subscriber unit to spend more time in the low power state, thus reducing power consumption and increasing standby time.

W-CDMA searchers designed to reduce search time will accrue the benefits just described. In addition, however, efficiency of implementation is also important to reduce integrated circuit area and power consumption. Step two of the 3-step search method described above is a complex procedure. There is therefore a need in the art for efficient searchers that can perform step two W-CDMA searching, and similar procedures.

SUMMARY

Embodiments disclosed herein address the need for efficient searching in asynchronous systems such as W-CDMA. In one aspect, a plurality of codes, such as SSCs, are correlated with a received signal at a plurality of offsets to produce a code/slot energy corresponding to each code/slot boundary pair. Unique subsets of the code/slot energies are summed to produce code sequence energies, the maximum of which indicates a located code sequence and slot boundary. In another aspect, the correlation is performed by sub-correlating the received signal with a common sequence, and performing a Fast Hadamard Transform (FHT) on the results. In yet another aspect, one sub-correlator can be used to search a plurality of peaks simultaneously. Various other aspects of the invention are also presented. These aspects have the benefit of circuit area and search-time efficiency which translate into reduced costs, increased standby time, increased acquisition speed, higher quality signal transmission, increased data throughput, decreased power, and improved overall system capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
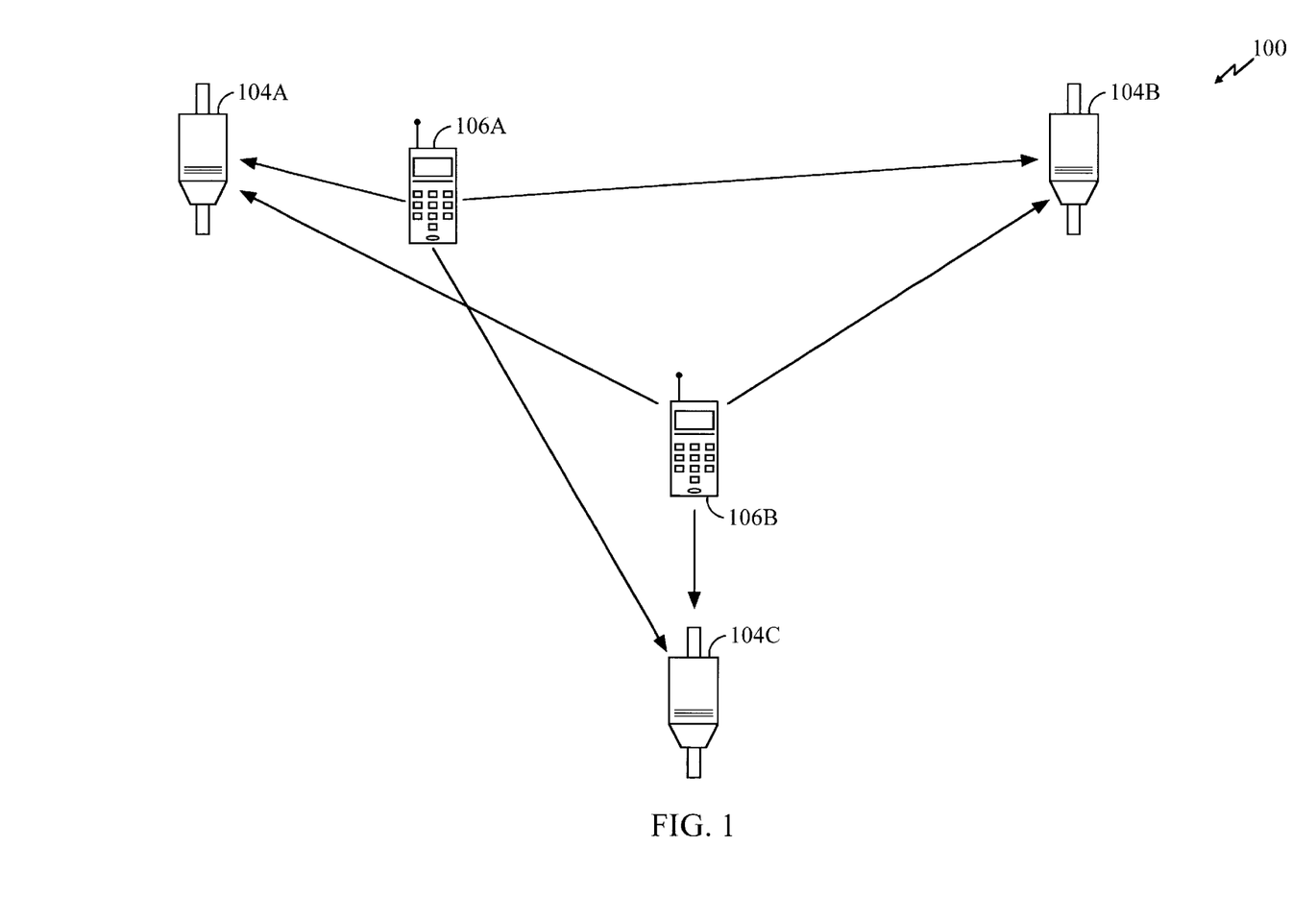
FIG. 1 is a general block diagram of a wireless communication system capable of supporting a number of users.

FIG. 1 is a diagram of a wireless communication system 100 that supports a number of users, and which can implement various aspects of the invention. System 100 may be designed to support one or more CDMA standards and/or designs (e.g., the W-CDMA standard, the IS-95 standard, the cdma2000 standard, the HDR specification). For simplicity, system 100 is shown to include three base stations 104 in communication with two subscriber units 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the term access point. The term subscriber unit can be used interchangeably with the terms user equipment (UE), mobile station, subscriber station, access terminal, remote terminal, or other corresponding terms known in the art. The term mobile station encompasses fixed wireless applications.

Depending on the CDMA system being implemented, each subscriber unit 106 may communicate with one (or possibly more) base stations 104 on the forward link at any given moment, and may communicate with one or more base stations on the reverse link depending on whether or not the subscriber unit is in soft handoff. The forward link (i.e., downlink) refers to transmission from the base station to the subscriber unit, and the reverse link (i.e., uplink) refers to transmission from the subscriber unit to the base station.

For clarity, the examples used in describing this invention will assume base stations as the originator of signals and subscriber units as receivers and acquirers of those signals, i.e. signals on the forward link. Those skilled in the art will understand that subscriber units as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Recall that W-CDMA searching can be carried out using a three-step procedure. In step one, the subscriber unit searches for the primary synchronization code (PSC), a component of the primary synchronization channel. The PSC is a fixed 256-chip sequence that is transmitted during the first 256 chips of each 2,560-chip slot. The PSC is the same for every cell in the system. The PSC is useful for detecting the presence of a base station, and once it is acquired, slot timing is also acquired.

In step two the subscriber unit searches for the secondary synchronization codes (SSCs), which make up the secondary synchronization channel. There are 16 256-chip SSCs. Each base station transmits one SSC, along with the PSC, in the first 256 chips of every slot (each of the 16 SSCs and the PSC are orthogonal). There are 64 unique sequences of 15 SSCs, each sequence being associated with one of 64 scrambling code groups. Each base station transmits one SSC sequence (15 SSCs per frame) corresponding to the code group containing that base station's scrambling code. The set of 64 SSC sequences are selected to be comma free; that is, no sequence is equal to a cyclic shift of any of the other sequences or any non-trivial cyclic shift of itself. Because of this property, once a subscriber unit determines the sequence of SSCs transmitted in any 15 consecutive slots, it can determine both the frame timing and which of the 64 SSC sequences was transmitted, thus identifying the scrambling code group in which the base station belongs. Since there are eight codes in each scrambling code group, the number of candidates has been reduced to eight.

In step three, the eight scrambling code candidates identified in step two must be searched to determine which one is the correct code. This can be carried out by performing a chip-by-chip correlation, accumulating energies over some number of chips until a decision can be made.

Recall that step two search begins with slot boundaries corresponding to peaks determined in step one. The desired result of step two is to locate frame timing, i.e. which slot corresponds with the first slot in a frame, and to identify which SSC sequence is being transmitted. Identifying the SSC sequence will reduce the candidate set from 512 possible primary scrambling codes to a maximum of eight for further searching in step three. Note that while the description herein makes extensive reference to the W-CDMA standard, the principles of the present invention apply equally to all conceivable systems deployed with similar properties.

Figure 2:
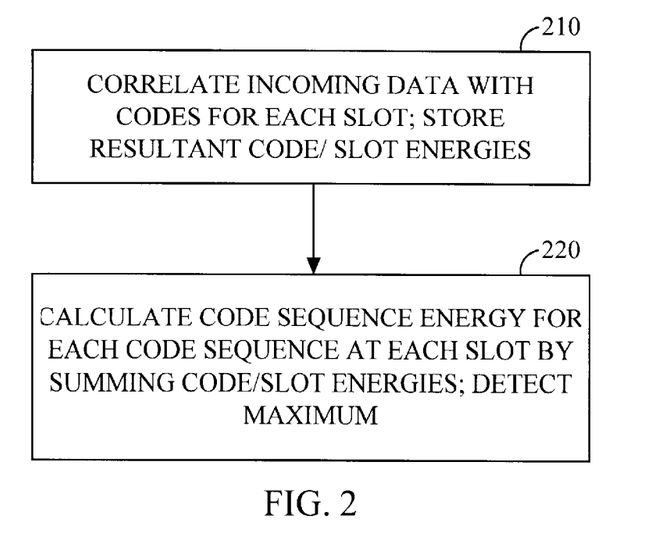
FIG. 2 depicts a step two W-CDMA search method.

FIG. 2 depicts an embodiment of a two-step procedure for performing step two W-CDMA search. To avoid confusing the nomenclature of steps in the 3-step W-CDMA search procedure, described above, with the steps of the two-step procedure depicted in FIG. 2, the latter will be referred to herein as sub-steps.

In the first sub-step 210, incoming I and Q samples are correlated with the 16 SSCs, $C_{ssc,1}, \ldots, C_{ssc,16}$, at each of the 15 time slots to produce 240 energies, each energy corresponding to an SSC/slot hypothesis. The 240 resultant SSC/slot energies can be conceptualized as a 15 by 16 matrix, with 15 columns corresponding to slot number hypotheses and 16 rows corresponding to SSC hypotheses.

In the second sub-step 220, an energy value for each of the 64 SSC sequences is calculated for each of the 15 possible slot hypotheses. Therefore, 960 SSC sequence energy values are computed. The highest SSC sequence energy indicates that its associated SSC sequence and slot hypothesis most likely identify the scrambling code group and frame timing.

Table 1 defines the 64 SSC sequences, one for each scrambling code group, labeled as Group 0 through Group 63. The slot numbers are labeled #0 through #14. For a given Group/Slot Number pair, one of the 16 SSCs will be transmitted. For example, the SSC sequence used to identify scrambling code group zero transmits $C_{ssc,1}$ in slot 0 and slot 1, $C_{ssc,2}$ in slot 2, $C_{ssc,8}$ in slot 3, and so forth. Thus, to complete sub-step 220, a slot hypothesis is chosen to be slot #0, and 64 sequence energies are calculated using that assumption. Then another slot hypothesis is chosen to be slot

0, and an additional 64 energies are calculated under the new assumption. The process is repeated until 64 energies are calculated at 15 slot hypotheses. During the energy calculation process, a maximum energy detection process can be employed, such that only the highest energy and its associated group and slot numbers are stored as each SSC sequence/slot hypothesis is tested.

The 16 256-chip SSCs, $C_{ssc,1}, \ldots, C_{ssc,16}$, are defined in the W-CDMA standard. They are complex-valued with identical real and imaginary components. They are constructed by position-wise multiplication of a 256-chip Hadamard sequence and a 256-chip sequence z, defined in equation 2 below. Sequence z is defined in terms of 16-chip sequence b, defined in equation 1.

TABLE 1

| Scrambling Code Group | Slot Number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 0  | 1 | 1  | 2  | 8  | 9  | 10 | 15 | 8  | 10 | 16 | 2  | 7  | 15 | 7  | 16 |
| Group 1  | 1 | 1  | 5  | 16 | 7  | 3  | 14 | 16 | 3  | 10 | 5  | 12 | 14 | 12 | 10 |
| Group 2  | 1 | 2  | 1  | 15 | 5  | 5  | 12 | 16 | 6  | 11 | 2  | 16 | 11 | 15 | 12 |
| Group 3  | 1 | 2  | 3  | 1  | 8  | 6  | 5  | 2  | 5  | 8  | 4  | 4  | 6  | 3  | 7  |
| Group 4  | 1 | 2  | 16 | 6  | 6  | 11 | 15 | 5  | 12 | 1  | 15 | 12 | 16 | 11 | 2  |
| Group 5  | 1 | 3  | 4  | 7  | 4  | 1  | 5  | 5  | 3  | 6  | 2  | 8  | 7  | 6  | 8  |
| Group 6  | 1 | 4  | 11 | 3  | 4  | 10 | 9  | 2  | 11 | 2  | 10 | 12 | 12 | 9  | 3  |
| Group 7  | 1 | 5  | 6  | 6  | 14 | 9  | 10 | 2  | 13 | 9  | 2  | 5  | 14 | 1  | 13 |
| Group 8  | 1 | 6  | 10 | 10 | 4  | 11 | 7  | 13 | 16 | 11 | 13 | 6  | 4  | 1  | 16 |
| Group 9  | 1 | 6  | 13 | 2  | 14 | 2  | 6  | 5  | 5  | 13 | 10 | 9  | 1  | 14 | 10 |
| Group 10 | 1 | 7  | 8  | 5  | 7  | 2  | 4  | 3  | 8  | 3  | 2  | 6  | 6  | 4  | 5  |
| Group 11 | 1 | 7  | 10 | 9  | 16 | 7  | 9  | 15 | 1  | 8  | 16 | 8  | 15 | 2  | 2  |
| Group 12 | 1 | 8  | 12 | 9  | 9  | 4  | 13 | 16 | 5  | 1  | 13 | 5  | 12 | 4  | 8  |
| Group 13 | 1 | 8  | 14 | 10 | 14 | 1  | 15 | 15 | 8  | 5  | 11 | 4  | 10 | 5  | 4  |
| Group 14 | 1 | 9  | 2  | 15 | 15 | 16 | 10 | 7  | 8  | 1  | 10 | 8  | 2  | 16 | 9  |
| Group 15 | 1 | 9  | 15 | 6  | 16 | 2  | 13 | 14 | 10 | 11 | 7  | 4  | 5  | 12 | 3  |
| Group 16 | 1 | 10 | 9  | 11 | 15 | 7  | 6  | 4  | 16 | 5  | 2  | 12 | 13 | 3  | 14 |
| Group 17 | 1 | 11 | 14 | 4  | 13 | 2  | 9  | 10 | 12 | 16 | 8  | 5  | 3  | 15 | 6  |
| Group 18 | 1 | 12 | 12 | 13 | 14 | 7  | 2  | 8  | 14 | 2  | 1  | 13 | 11 | 8  | 11 |
| Group 19 | 1 | 12 | 15 | 5  | 4  | 14 | 3  | 16 | 7  | 8  | 6  | 2  | 10 | 11 | 13 |
| Group 20 | 1 | 15 | 4  | 3  | 7  | 6  | 10 | 13 | 12 | 5  | 14 | 16 | 8  | 2  | 11 |
| Group 21 | 1 | 16 | 3  | 12 | 11 | 9  | 13 | 5  | 8  | 2  | 14 | 7  | 4  | 10 | 15 |
| Group 22 | 2 | 2  | 5  | 10 | 16 | 11 | 3  | 10 | 11 | 8  | 5  | 13 | 3  | 13 | 8  |
| Group 23 | 2 | 2  | 12 | 3  | 15 | 5  | 8  | 3  | 5  | 14 | 12 | 9  | 8  | 9  | 14 |
| Group 24 | 2 | 3  | 6  | 16 | 12 | 16 | 3  | 1  | 13 | 6  | 7  | 9  | 2  | 12 | 7  |
| Group 25 | 2 | 3  | 8  | 2  | 9  | 15 | 14 | 33 | 14 | 9  | 5  | 5  | 15 | 8  | 12 |
| Group 26 | 2 | 4  | 7  | 9  | 5  | 4  | 9  | 11 | 2  | 14 | 5  | 14 | 11 | 16 | 16 |
| Group 27 | 2 | 4  | 13 | 12 | 12 | 7  | 15 | 10 | 5  | 2  | 15 | 5  | 13 | 7  | 4  |
| Group 28 | 2 | 5  | 9  | 9  | 3  | 12 | 8  | 14 | 15 | 12 | 14 | 5  | 3  | 2  | 15 |
| Group 29 | 2 | 5  | 11 | 7  | 2  | 11 | 9  | 4  | 16 | 7  | 16 | 9  | 14 | 14 | 4  |
| Group 30 | 2 | 6  | 2  | 13 | 3  | 3  | 12 | 9  | 7  | 16 | 6  | 9  | 16 | 13 | 12 |
| Group 31 | 2 | 6  | 9  | 7  | 7  | 16 | 13 | 3  | 12 | 2  | 13 | 12 | 9  | 16 | 6  |
| Group 32 | 2 | 7  | 12 | 15 | 2  | 12 | 4  | 10 | 13 | 15 | 13 | 4  | 5  | 5  | 10 |
| Group 33 | 2 | 7  | 14 | 16 | 5  | 9  | 2  | 9  | 16 | 11 | 11 | 5  | 7  | 4  | 14 |
| Group 34 | 2 | 8  | 5  | 12 | 5  | 2  | 14 | 14 | 8  | 15 | 3  | 9  | 12 | 15 | 9  |
| Group 35 | 2 | 9  | 13 | 4  | 2  | 13 | 8  | 11 | 6  | 4  | 6  | 8  | 15 | 15 | 11 |
| Group 36 | 2 | 10 | 3  | 2  | 13 | 16 | 8  | 10 | 8  | 13 | 11 | 11 | 16 | 3  | 5  |
| Group 37 | 2 | 11 | 15 | 3  | 11 | 6  | 14 | 10 | 15 | 10 | 6  | 7  | 7  | 14 | 3  |
| Group 38 | 2 | 16 | 4  | 5  | 16 | 14 | 7  | 11 | 4  | 11 | 14 | 9  | 9  | 7  | 5  |
| Group 39 | 3 | 3  | 4  | 6  | 11 | 12 | 13 | 6  | 12 | 14 | 4  | 5  | 13 | 5  | 14 |
| Group 40 | 3 | 3  | 6  | 5  | 16 | 9  | 15 | 5  | 9  | 10 | 6  | 4  | 15 | 4  | 10 |
| Group 41 | 3 | 4  | 5  | 14 | 4  | 6  | 12 | 13 | 5  | 13 | 6  | 11 | 11 | 12 | 14 |
| Group 42 | 3 | 4  | 9  | 16 | 10 | 4  | 16 | 15 | 3  | 5  | 10 | 5  | 15 | 6  | 6  |
| Group 43 | 3 | 4  | 16 | 10 | 5  | 10 | 4  | 9  | 9  | 16 | 15 | 6  | 3  | 5  | 15 |
| Group 44 | 3 | 5  | 12 | 11 | 14 | 5  | 11 | 13 | 3  | 6  | 14 | 6  | 13 | 4  | 4  |
| Group 45 | 3 | 6  | 4  | 10 | 6  | 5  | 9  | 15 | 4  | 15 | 5  | 16 | 16 | 9  | 10 |
| Group 46 | 3 | 7  | 8  | 8  | 16 | 11 | 12 | 4  | 15 | 11 | 4  | 7  | 16 | 3  | 15 |
| Group 47 | 3 | 7  | 16 | 11 | 4  | 15 | 3  | 15 | 11 | 12 | 12 | 4  | 7  | 8  | 16 |
| Group 48 | 3 | 8  | 7  | 15 | 4  | 8  | 15 | 12 | 3  | 16 | 4  | 16 | 12 | 11 | 11 |
| Group 49 | 3 | 8  | 15 | 4  | 16 | 4  | 8  | 7  | 7  | 15 | 12 | 11 | 3  | 16 | 12 |
| Group 50 | 3 | 10 | 10 | 15 | 16 | 5  | 4  | 6  | 16 | 4  | 3  | 15 | 9  | 6  | 9  |
| Group 51 | 3 | 13 | 11 | 5  | 4  | 12 | 4  | 11 | 6  | 6  | 5  | 3  | 14 | 13 | 12 |
| Group 52 | 3 | 14 | 7  | 9  | 14 | 10 | 13 | 8  | 7  | 8  | 10 | 4  | 4  | 13 | 9  |
| Group 53 | 5 | 5  | 8  | 14 | 16 | 13 | 6  | 14 | 13 | 7  | 8  | 15 | 6  | 15 | 7  |
| Group 54 | 5 | 6  | 11 | 7  | 10 | 8  | 5  | 8  | 7  | 12 | 12 | 10 | 6  | 9  | 11 |
| Group 55 | 5 | 6  | 13 | 8  | 13 | 5  | 7  | 7  | 6  | 16 | 14 | 15 | 8  | 16 | 15 |
| Group 56 | 5 | 7  | 9  | 10 | 7  | 11 | 6  | 12 | 9  | 12 | 11 | 8  | 8  | 6  | 10 |
| Group 57 | 5 | 9  | 6  | 8  | 10 | 9  | 8  | 12 | 5  | 11 | 10 | 11 | 12 | 7  | 7  |
| Group 58 | 5 | 10 | 10 | 12 | 8  | 11 | 9  | 7  | 8  | 9  | 5  | 12 | 6  | 7  | 6  |
| Group 59 | 5 | 10 | 12 | 6  | 5  | 12 | 8  | 9  | 7  | 6  | 7  | 8  | 11 | 11 | 9  |
| Group 60 | 5 | 13 | 15 | 15 | 14 | 8  | 6  | 7  | 16 | 8  | 7  | 13 | 14 | 5  | 16 |
| Group 61 | 9 | 10 | 13 | 10 | 11 | 15 | 15 | 9  | 16 | 12 | 14 | 13 | 16 | 14 | 11 |
| Group 62 | 9 | 11 | 12 | 15 | 12 | 9  | 13 | 13 | 11 | 14 | 10 | 16 | 15 | 14 | 16 |
| Group 63 | 9 | 12 | 10 | 15 | 13 | 14 | 9  | 14 | 15 | 11 | 11 | 13 | 12 | 16 | 10 |

$$b = <1,1,1,1,1,1,-1,-1,1,-1,1,-1,1,-1,1,1> \quad (1)$$

$$z = <b,b,b,-b,b,b,-b,-b,b,-b,b,-b,-b,-b,-b,-b> \quad (2)$$

The Hadamard sequences are obtained from rows of matrix $H_8$, constructed recursively using equations 3 and 4. Note that the variable, k, used in equation 4 is for recursively constructing $H_8$ and is not to be confused with the index k used to identify the $k^{th}$ SSC, that is $C_{ssc,k}$ where k ranges from 1 to 16.

$$H_0 = [1] \quad (3)$$

$$H_k = \begin{bmatrix} H_{k-1} & H_{k-1} \\ H_{k-1} & -H_{k-1} \end{bmatrix}, k \geq 1 \quad (4)$$

Let $h_n$ denote a Hadamard sequence defined as the $n^{th}$ row of $H_8$, where n ranges from 0 to 255, and the top row is $h_0$. Let $h_n(i)$ and $z(i)$ denote the $i^{th}$ symbol of sequences $h_n$ and z, respectively. Then the 16 SSCs are generated as defined in equations 5 and 6 below.

$$C_{ssc,k} = (1+j) \times <h_{m(0)} \times z(0), h_{m(1)} \times z(1), K, h_{m(255)} \times z(255)> \quad (5)$$

$$m = 16(k-1) \quad (6)$$

As described in more detail in the following embodiments, the structure of the SSCs can be exploited to simplify the computation involved in correlating 256 I and Q input samples with each of the 16 SSCs. The real and imaginary components of the $n^{th}$ chip, where $0 \leq n \leq 255$, of the $k^{th}$ SSC, where $1 \leq k \leq 16$, can be written as shown in equation 7 (recall that the SSC is equal in the real and imaginary space). B is a 16-chip sequence defined in equation 8, b is the 16-chip sequence defined in equation 1, and $h_{k-1}$ is a length-16 Hadamard sequence defined as the $(k-1)^{th}$ row of $H_4$, generated according to equations 3 and 4.

$$C_{ssc,k}(n) = B(n \text{ div } 16) \times b(n \text{ mod } 16) \times h_{k-1}(n \text{ div } 16) \quad (7)$$

$$B = \frac{z}{b} = <1, 1, 1, -1, 1, 1, -1, -1, 1, -1, 1, -1, -1, -1, -1, -1> \quad (8)$$

It can be proven that the correlation of the incoming I and Q data stream, $X_0, \ldots, X_{255}$, with the $k^{th}$ SSC, $C_{ssc,k}$, is given by equation 9.

$$\text{Correlation}((X_0, K, X_{255}), C_{ssc,k}) = \sum_{q=0}^{15} \left[ \sum_{r=0}^{15} X_{16q+r} b(r) \right] \times h_{k-1}(q) \quad (9)$$

Equation 9 can be computed by calculating a length-16 sub-correlation sequence, given in equation 10, and performing a length-16 Fast Hadamard Transform (FHT) on the resulting sub-correlation sequence.

$$\text{Subcorr}(q) = B(q) \sum_{r=0}^{15} X_{16q+r} b(r) \quad q = 0, 1, K15 \quad (10)$$

The results of the FHT will be the correlations of the incoming I and Q data stream with the 16 SSCs. The resulting 16 I and Q values can be squared and summed to produce an energy value for each of the 16 SSCs. This process can be repeated for each of the 15 time slots to produce a 15 by 16 matrix of energies, each energy corresponding to one SSC/slot hypothesis.

Figure 3:
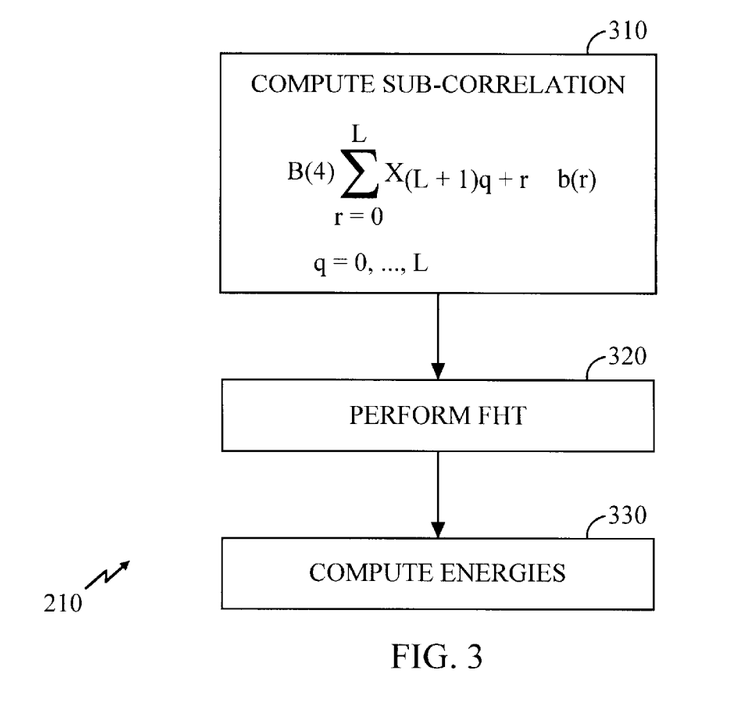
FIG. 3 depicts a detailed embodiment of the first sub-step of the step two W-CDMA search method.

FIG. 3 depicts an embodiment of a procedure for implementing sub-step 210, described above. In step 310, a length-16 sub-correlation sequence is calculated according to equation 10. Step 310 shows a generalized sub-correlation for length-L sequences and general sequences B and b, of which equation 10 is an example. A Fast Hadamard Transform is performed on the resulting sub-correlation sequence in step 320. The resultant 16 I and Q pairs from step 320 are squared and summed in step 330 to produce 16 energy values. The process can be repeated for 15 different offsets to produce the 240 energy values described above. Step 330 may also entail storing each result in a memory.

It should be noted that in all the embodiments described herein, the energy calculation for each SSC and slot number may be accumulated over multiple frames. Accumulating over multiple frames produces a more accurate energy value, with the natural trade-off of increased search time. So, if accumulation over a number of frames is desired, step 330 may entail reading a value out of a memory, performing the squaring and summing on a corresponding SSC/slot output, summing the two energies, and storing the result back in the memory.

Figure 4:
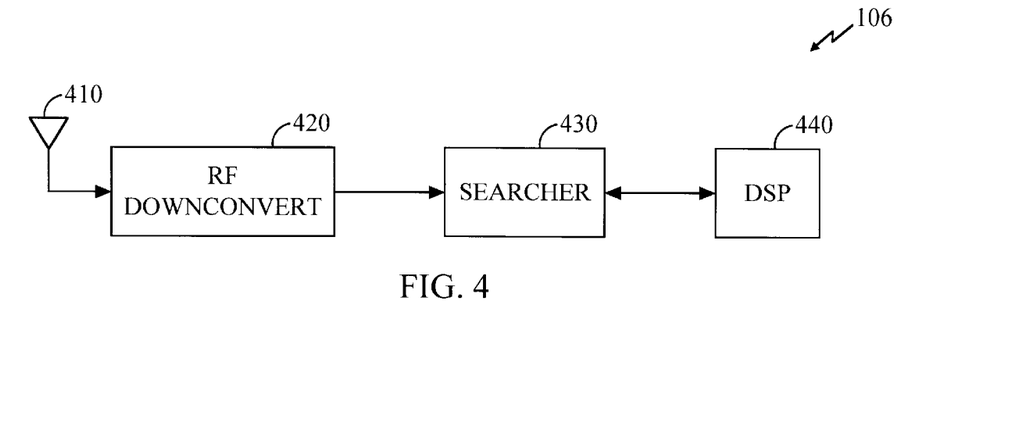
FIG. 4 depicts a subscriber unit configured in accordance with an embodiment of the present invention.

FIG. 4 shows an embodiment of subscriber unit 106, configured for performing both sub-steps 210 and 220, described above. Only a subset of the components of a subscriber unit are shown. Signals are received at antenna 410, and delivered to RF downconvert block 420 for amplification, downconversion, and sampling. Various techniques for downconverting CDMA signals to baseband are known in the art. From RF downconvert block 420, I and Q samples are delivered to searcher 430. Searcher 430 is in communication with a digital signal processor (DSP) 440. Alternatives to employing a DSP include using another type of general purpose processor, or specialized hardware designed to carry out various tasks related to searching that might be employed in the DSP. Depending on the capabilities of searcher 430, DSP 440 will carry out various tasks described in the sub-steps 210 or 220 above, and coordinate the performance of the remaining tasks in searcher 430. While only one searcher 430 is shown in FIG. 4, any number of searchers can be implemented in parallel in accordance with principles of the present invention. Searcher 430 can deliver energy values corresponding to SSC sequences and offsets to DSP 440. Or, a single SSC/slot number pair may be delivered indicating the SSC and slot number of the maximum calculated SSC energy sequence. Alternatively, intermediate values may be computed at any point in the process in searcher 430 for delivery to DSP 440 for subsequent processing. DSP 440 may return processed intermediate values to searcher 430 for subsequent processing as well. Various alternative configurations of DSP/dedicated hardware will be clear to those of skill in the art and fall within the scope of the present invention.

Figure 5:
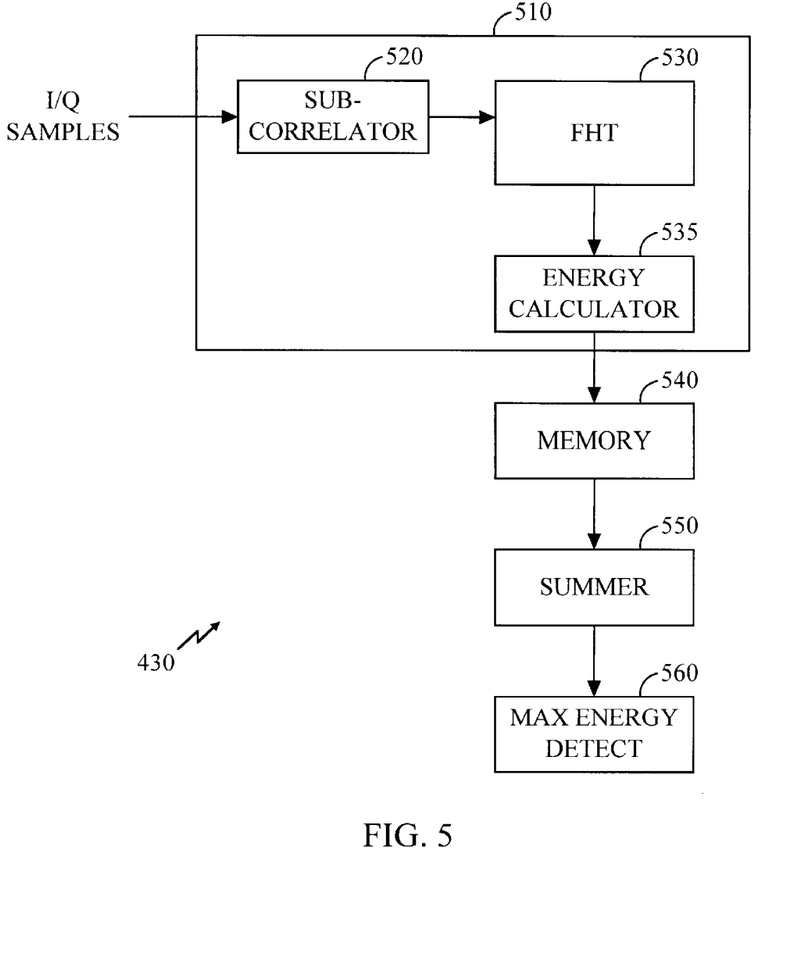
FIG. 5 depicts an embodiment of a step two W-CDMA searcher.

FIG. 5 depicts an embodiment of searcher 430, suitable for performing both sub-steps 210 and 220, described above. I and Q samples enter correlator 510, where they are correlated with each of the 16 SSCs at each of the 15 offsets. The results are stored in memory 540. As described above, energy results for multiple frames may be accumulated and stored in memory 540. Summer 550 reads SSC/slot energy values out of memory 540 according to each defined SSC sequence, given in Table 1 above, for each slot hypothesis. The SSC/slot energies are added to produce a SSC sequence energy. The SSC sequence energies are delivered to max energy detect 560 for detection of the maximum energy, which corresponds to the most likely scrambling code group and frame timing.

An alternative embodiment, not shown, would have the SSC/slot energies delivered to the memory 540 via direct memory access (DMA), a technique well known in the art. Summer 550 and max enegy detect 550 may be combined in one circuit, or the functions of both can be carried out in DSP 440.

In FIG. 5, correlator 510 contains sub-correlator 520, FHT 530, and energy calculator 535. This is one embodiment of correlator 510. Sub-correlator 520 produces a length-16 sub-correlation sequence for delivery to FHT 530. This sequence can be generated according to equation 10, described above, or step 310 described above with respect to FIG. 3. A sub-correlation sequence can be generated for each of the 15 slot hypotheses. The delivery to FHT 530 may be direct, through DSP 440, or via DMA to an intermediate memory (not shown), as described above.

In an alternate embodiment, not shown, a coherent accumulator can be inserted between sub-correlator 520 and FHT 530. Thus, multiple frames can be coherently accumulated, resulting in fewer accesses of FHT 530, and the performance enhancements of increased coherent accumulation. To use this alternative, the frequency error must be low enough that multiple frames are within the coherence bandwidth. FHT 530 will be supplied with the accumulated outputs of sub-correlator 520, and the results will be delivered to energy calculator 535. (Alternatively, FHT 530 can be accessed every frame, with the results only being used during periods that the output is valid). Non-coherent accumulation, accumulation of energies from energy calculator 535, need only be performed when a valid output of FHT 530 is produced.

FHT 530 may employ one of a number of FHT techniques known in the art. One technique is disclosed in U.S. Pat. No. 5,561,618 entitled "METHOD AND APPARATUS FOR PERFORMAING A FAST HADAMARD TRANSFORM", assigned to the assignee of the present invention. FHT techniques can be used to reduce complexity order from $n^2$ to $n*\log_2 n$, or in this case, from $16^2=256$ to $16*\log_2 16=64$. For each sub-correlation sequence input to FHT 530, 16 correlated outputs are generated for the 16 SSCs (corresponding to one slot hypothesis).

The 16 correlations, with I and Q components, are delivered from FHT 530 to energy calculator 535, where the energy of each correlation is computed as $I^2+Q^2$.

Figure 6:
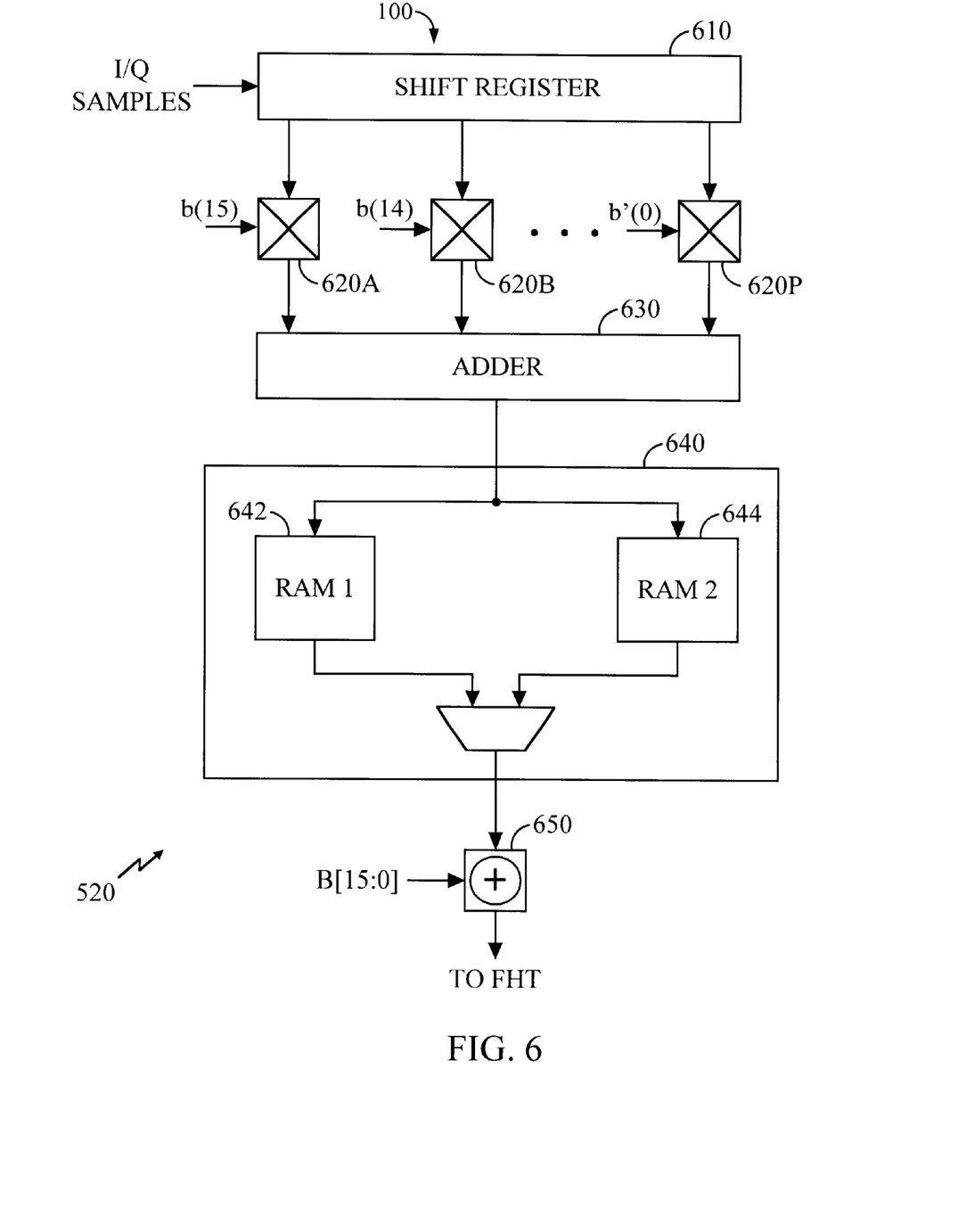
FIG. 6 depicts a detailed embodiment of a sub-correlator configured for use in a step two W-CDMA searcher.

FIG. 6 depicts an embodiment of sub-correlator 520. I and Q samples enter a 32-stage, 16-tap shift register 610, clocked at the chip rate times two. This allows correlation on half-chip boundaries, a practice common in the art. Other sampling rates are known and within the scope of the present invention. The I and Q samples can be optionally decimated, rotated, or code-Doppler adjusted prior to delivery to the shift register 610 (not shown). The tapped values from shift register 610 are, in general, BPSK despreaded with the sequence b[15:0]. However, since the SSCs are equal valued in the real and imaginary space, the BPSK despreaders can be collapsed into real multipliers, 620a–620p. The despread I and Q samples are then summed in adder 630, which can be an adder tree or any adder known in the art. The result of adder 630 (an I/Q pair) at any given time may be a partial one of the sub-correlation sequence values, corresponding to index q, defined in equation 10, above. However, multiplication by series B, defined in equation 8 above, remains.

The partial sub-correlation sequence values can be stored in memory 640, until delivery to an FHT such as FHT 530 is available. The sub-correlation sequence is produced by multiplying the partial sub-correlation sequence with B[15:0] in multiplier 650, which can be performed as the results are accessed from memory 640. Since the sequence B, comprising values of 1 and −1, can be represented in digital form as a sequence of 1 and 0, multiplier 650 collapses to a bitwise XOR gate. In an alternative embodiment (not shown), memory 640 is not deployed, and the output of the adder 630 is XORed in multiplier 650 directly. In this alternative, the FHT must be equipped to receive the serial stream of values, or some other management scheme must be employed.

Note that for searching a single peak, values produced by adder 630 are not stored during every cycle. Using the parameters defined in equation 10, a partial sub-correlation value is generated at the output of adder 630 every 16 chips. Therefore, the sub-correlator can be used to produce additional sub-correlation sequences at offsets in between those 16 chips. Furthermore, the SSC is only transmitted during the first 256 chips of the frame, the time when a particular sub-correlation sequence will be generated. That leaves the sub-correlator available for searching additional peaks during the rest of the frame.

In FIG. 6, memory 640 is shown to include RAM1 642, RAM2 644, and mux 646. This is one embodiment of memory 640 which is suitable for processing multiple peaks. Memory 640 includes two RAMS, RAM1 642 and RAM2 644, so that one RAM is always available for writing when the other is being written. Each RAM can be used to store multiple pages, where each page corresponds to one peak being searched. In the exemplary embodiment, six peaks can be simultaneously searched, and so RAM1 642 holds three pages and RAM2 644 holds three pages. As an example, I and Q values may be stored with 10 bits each, so the page width would be 20 bits. The page depth would be 16, to store each partial sub-correlation value corresponding to q=0, 1, 2, . . . , 15. (Recall that a partial sub-correlation value for a sub-correlation sequence is generated every 16 chips.) In the exemplary embodiment, once a page is filled it can be transferred via DMA to DSP 440 through mux 646, which selects the RAM to be accessed. (The sequence is XORed with B on the way out, as described above). DSP 440, in conjunction with an FHT co-processor (not shown, but can be similar to FHT 530), processes the sub-correlation sequences to produce the correlations corresponding to each SSC and slot number.

Note that in the previous embodiment, the FHT engine used to process the sub-correlated sequences is a co-processor to a DSP which can be used for many other tasks in a subscriber unit, in addition to searching. In fact, a subscriber unit may be equipped with one or more FHT engines deployed for use in a variety of processing tasks. Thus, the incremental area needed to deploy this embodiment is reduced when an existing FHT resource is available for time-sharing.

Various embodiments can also take advantage of another aspect of this invention, mentioned above in the description of the embodiment of FIG. 6. That is, a single SSC sub-correlator, such as sub-correlator 520, can be time-sliced and shared for a number of search tasks. The example given above supported six simultaneous peak searches, but any number of peaks falls within the scope of the present invention. The FHT must be invoked for each sub-correlation sequence of each of the peaks, which can be accomplished by serially accessing the FHT or deploying more than one FHT in parallel. In alternative embodiments, the FHT process can be carried out in a DSP. Thus, the designer can trade off three factors to tailor these principles to achieve the desired outcome. First, the clock time of the shared sub-correlator can be made faster in relation to the chip time to increase the number of peaks served. Second, the memory for storing sub-correlation sequences prior to FHT processing can be increased or decreased based on the available FHT throughput. Third, FHT throughput can be increased or decreased by adjusting the clock frequency of the FHT engine or DSP performing the FHT procedure, or by deploying parallel FHT resources (DSP or FHT). Those skilled in the art will recognize the myriad combinations of these three factors which can be deployed, all of which are within the scope of the present invention.

Note also that the foregoing discussion has used the signals, codes and parameters defined in the W-CDMA standard as the exemplary signals, codes and parameters. This is for clarity of discussion only, and does not limit the scope of the present invention to W-CDMA systems. Any set of codes corresponding to code groups which contain the relationship exploited by exemplary equation 7 above fall squarely within the scope of the present invention, and those skilled in the art will recognize how to adapt the various embodiments described for use with such alternate systems.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A sub-correlator comprising:
   a shift register for receiving samples of a received signal;
   a plurality of multipliers for multiplying samples from the shift register with a first component of a common sequence;
   an adder for adding the plurality of multiplier results;
   a memory for receiving and storing the output of the adder at periodic intervals to produce a stored partial sub-correlation sequence; and
   an XOR for receiving a partial sub-correlation sequence from the memory and bit-wise XORing the partial sub-correlation sequence with a second component of the common sequence to produce a sub-correlation sequence.

2. The sub-correlator of claim 1, wherein the memory receives and stores the output of the adder at a plurality of periodic intervals to produce a plurality of partial sub-correlation sequences.

3. The sub-correlator of claim 2, wherein the memory contains a plurality of random access memories (RAMs), each RAM selectable such that a first partial sub-correlation sequence can be written to a first RAM simultaneously with a read access of a second partial sub-correlation sequence from a second RAM.

4. A searcher for searching a plurality of peaks, comprising:
   a sub-correlator for correlating a received signal with a common sequence to produce a sub-correlation sequence for each of the plurality of peaks;
   one or more FHTs (Fast Hadamard Transform) for receiving the sub-correlation sequences and producing code/slot correlations for each of the plurality of peaks;
   one or more energy calculators for generating code/slot energies from the code/slot correlations for each of the plurality of peaks;
   one or more summers for summing unique subsets of the code/slot energies to produce a plurality of code sequence energies for each of the plurality of peaks; and
   one or more detectors for receiving the code sequence energies and detecting the maximum code sequence energy for each of the plurality of peaks.

5. An integrated circuit comprising:
   a shift register for receiving samples of a received signal;
   a plurality of multipliers for multiplying samples from the shift register with a first component of a common sequence;

an adder for adding the plurality of multiplier results;

a memory far receiving and storing the output of the adder at periodic intervals to produce a stored partial sub-correlation sequence; and an XOR for receiving a partial sub-correlation sequence from the memory and bit-wise XORing the partial sub-correlation sequence with a second component of the common sequence to produce a sub-correlation sequence.

6. The integrated circuit of claim 5, wherein the memory receives and stores the output of the adder at a plurality of periodic intervals to produce a plurality of partial sub-correlation sequences.

7. The integrated circuit of claim 6, wherein the memory contains a plurality of random access memories (RAMs), each RAM selectable such that a first partial sub-correlation sequence can be written to a first RAM simultaneously with a read access of a second partial sub-correlation sequence from a second RAM.

8. An integrated circuit comprising:

means for receiving samples of a received signal;

means for multiplying samples from the means for receiving with a first component of a common sequence;

means for adding the plurality of means for multiplying results;

means for receiving and storing the output of the means for adding at periodic intervals to produce a stored partial sub-correlation sequence; and means for receiving a partial sub-correlation sequence from the memory and bit-wise XORing the partial sub-correlation sequence with a second component of the common sequence to produce a sub-correlation sequence.

9. The integrated circuit of claim 8, wherein the means for receiving and storing receives and stores the output of the means for adding at a plurality of periodic intervals to produce a plurality of partial sub-correlation sequences.

10. The integrated circuit of claim 9, wherein the means for receiving and storing contains a plurality of random access memories (RAMs), each RAM selectable such that a first partial sub-correlation sequence can be written to a first RAM simultaneously with a read access of a second partial sub-correlation sequence from a second RAM.

11. An integrated circuit comprising:

a correlator for correlating a received signal with a plurality of codes at a plurality of slot boundaries to produce a code/slot energy corresponding to each code/slot boundary pair, the correlator comprising a sub-correlator for correlating the received signal with a common sequence to produce a sub-correlation sequence, an FHT (Fast Hadamard Transform) for receiving the sub-correlation sequence and producing code/slot correlations, and an energy calculator for generating code/slot energies from the code/slot correlations;

a memory for storing the code/slot energies; and a summer for summing unique subsets of the code/slot energies to produce a plurality of code sequence energies, wherein the sub-correlator comprises a shift register for receiving samples of the received signal;

a plurality of multipliers for multiplying samples from the shift register with a first component of the common sequence;

an adder for adding the plurality of multiplier results;

a memory for receiving and storing the output of the adder at periodic intervals to produce a stored partial sub-correlation sequence; and an XOR for receiving a partial sub-correlation sequence from the memory and bit-wise XORing the partial sub-correlation sequence with a second component of the common sequence to produce a sub-correlation sequence.

\* \* \* \* \*